Feb. 3, 1970   G. E. SUMRALL ET AL   3,493,160

RECORD MEDIUM TRANSPORT MEANS

Filed Oct. 16, 1967   2 Sheets-Sheet 1

INVENTORS,
GEORGE E. SUMRALL
ROBERT M. DUNN
ANTHONY V. CAMPI.
BY Daniel Sharp, Agent
Harry M. Saragovitz
Edward J. Kelly
& Herbert Berl
ATTORNEYS.

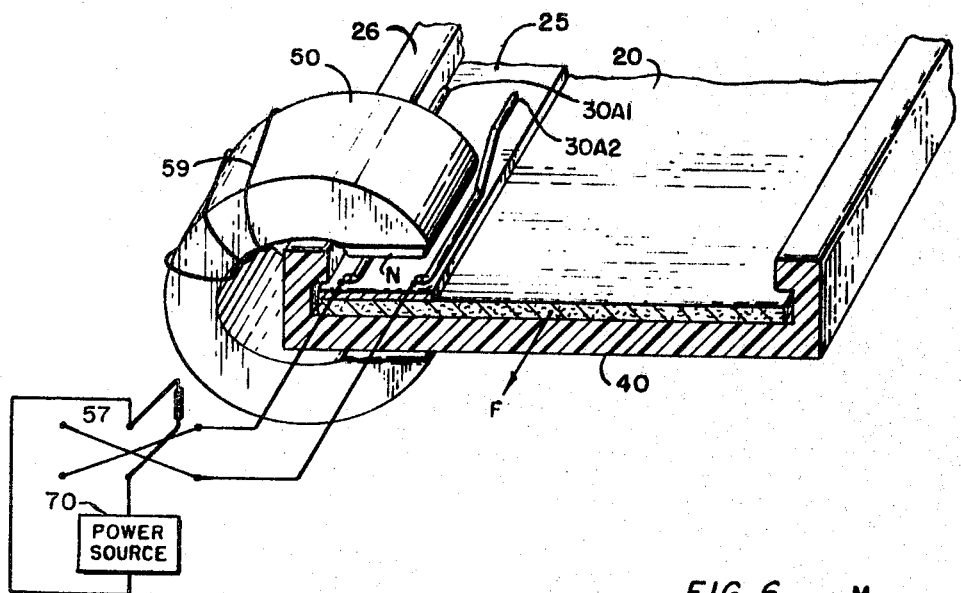
FIG. 4
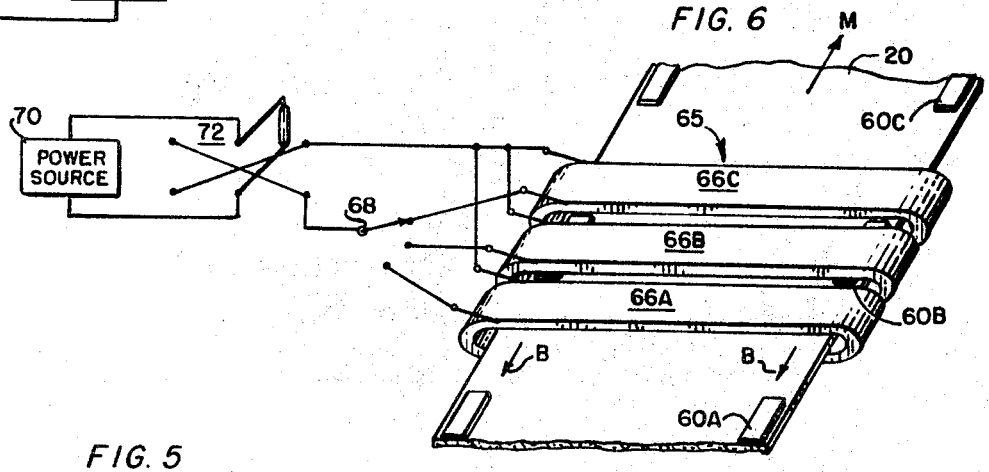
FIG. 6
FIG. 5
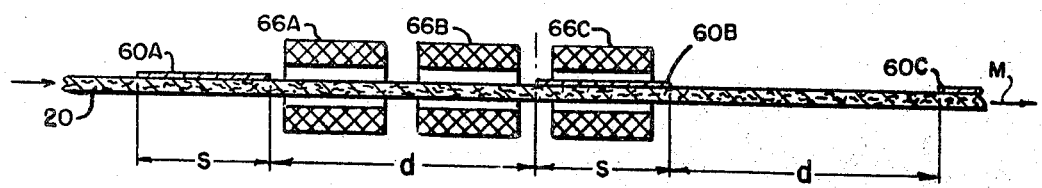
INVENTORS,
GEORGE E. SUMRALL
ROBERT M. DUNN
ANTHONY V. CAMPI.

United States Patent Office 3,493,160
Patented Feb. 3, 1970

---

3,493,160
RECORD MEDIUM TRANSPORT MEANS
George E Sumrall, Neptune, Robert M. Dunn, Eatontown, and Anthony V. Campi, West Long Branch, N.J., assignors to the United States of America as represented by the Secretary of the Army
Filed Oct. 16, 1967, Ser. No. 676,376
Int. Cl. B65h 17/22
U.S. Cl. 226—188      7 Claims

ABSTRACT OF THE DISCLOSURE

Means for moving an intelligence-bearing medium along a path by providing a magnetic field adjacent said path and wherein said medium carries means for providing interaction with said magnetic field which gives rise to a force for moving said medium.

An electrical current can be passed through an electrically conductive material disposed on said medium, the direction of the current flow being perpendicular to a magnetic field juxtaposed to said path and directed perpendicular to said path.

Alternatively, a plurality of spaced regions of magnetic material—herein defined as any material which experiences a force when subjected to a magnetic field—is disposed on said medium and a plurality of spaced magnetic field producing means are arranged adjacent said medium; by suitable energization of said magnetic field producing means, a force may be exerted on said spaced regions.

BACKGROUND OF THE INVENTION

Prior systems for card and paper transport have been mechanical systems. For example, paper strips have contained holes along the edges for receiving sprocket wheels, and the like, which upon rotation, cause motion of the paper. Other techniques include rotating drums between which the paper is transported under tension. Cards often are transported by gravity along a chute or grasped by some mechanical moving element.

In accordance with the invention, an electrical system for record transport is provided which uses magnetic fiild producing means in conjunction with either an electric current or a magnetic material and requires no mechanical parts, such as rotating drums, sprockets, gears, or the like.

SUMMARY OF THE INVENTION

In accordance with one technique of this invention, a unidirectional current is made to flow through an electrically conducting surface disposed on at least a portion of one side of a paper medium to be transported. This unidirectional current is caused to flow through said conductive surface in a direction perpendicular to the desired direction of paper motion and through a stationary magnetic field perpendicular to both the direction of the current flow and to the desired path along which the medium is to be transported. A force is exerted on the conductive material of the medium which is mutually perpendicular to said magnetic field and to the direction of current flow; this force causes the medium to move along the desired path in either the forward or reverse direction, depending upon the relative direction of the aforesaid mutually perpendicular magnetic fields. In some cases the conducting means may be disposed over the entire side of the medium. In other cases, the electrical conducting means may be in the form of a strip or strips disposed along the edge of the medium or strips transverse to the direction of motion. Once motion of the medium is achieved, it may be stopped by reversing the direction of one of the magnetic fields, normally, by reversing the direction of current flow through the electrically conducting coating or surface to provide a force in the opposite direction of motion. This technique may be used with a continuous elongated medium, such as a paper tape, or it may be used to transport unit records (punched cards, e.g.) between reading stations, punching stations or printing stations, etc.

In accordance with another technique of the invention, a plurality of magnetic regions of length $l$ are disposed on one side of the medium to be transported. The locus of the region is in the direction of motion of the medium. The distance $l$ between any two adjacent regions is an integral number of times the length of one region. The plurality of electromagnetic means are provided adjacent to aforesaid magnetic regions of said medium and the centers are spaced approximately the same distance as the length of the aforesaid magnetic regions. In other words, the length of each of the electromagnetic means is just slightly less than the length of the aforesaid magnetic regions on the medium. Initially, one of the magnetic regions will be juxtaposed to one of the electromagnetic means. The other electromagnetic means will be positioned opposite the space between adjacent magnetic regions. When that one of the other electromagnetic means nearest a magnetic region is energized, the magnetic region of the medium will be attracted thereby. The medium will be transported until that magnetic region becomes centered under said one other electromagnetic means, whereupon motion will cease and the medium will be held in that position for transfer of data to the medium, as by printing. When motion of the medium to the next position is desired, the next electromagnetic means is energized and the aforesaid magnetic region (and hence, the medium) now will be attracted to a new position. If motion is to be stopped, the field furnished by the appropriate electromagnetic means is maintained and a magnetic region will remain centered under the energized electromagnetic means. If continuous motion, rather than a stepping motion is desired, the electromagnetic means can be energized successively in a continuous sequence.

BRIEF DESCRIPTION OF THE DRAWINGS

FIG. 4 is a pictorial view of a device similar to that shown in FIG. 3; and

FIGS. 5 and 6 are views illustrating the principles of operation of a second technique according to the invention.

DESCRIPTION OF THE PREFERRED EMBODIMENTS OF THE INVENTION

Figure 1:
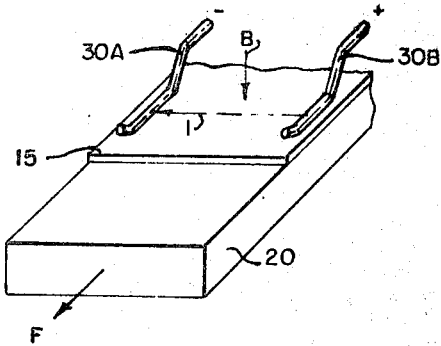
FIG. 1 is a view illustrating the operating principles of one technique of operation of the invention.
Figure 3:
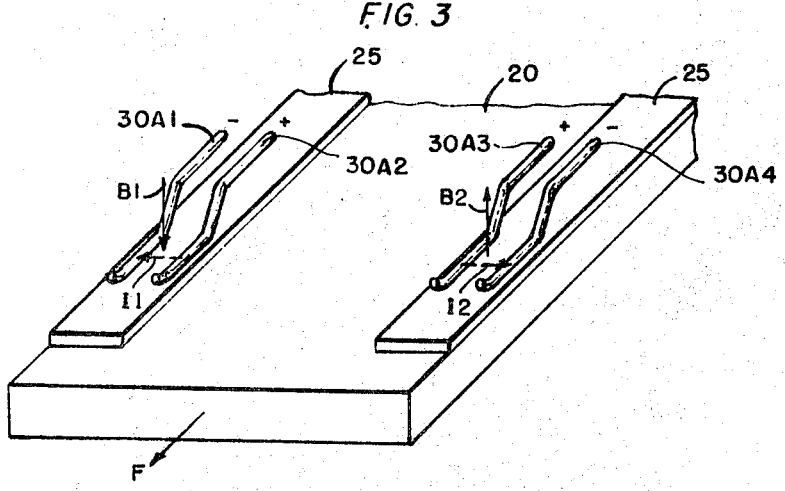
FIG. 3 is a view showing the modification of the versions of FIGS. 1 and 2 wherein elongated longitudinal electrically conductive strips are shown.

The basic operation of one embodiment of the invention is described by referring to FIGS. 1 and 3 of the drawing. In FIG. 1, an electrically conducting surface or coating 15 is disposed on one side of a medium 20 which is to be transported along a path indicated by the arrow F. This medium may, for example, be a strip of paper upon which information is to be printed or which contains printed information which is to be read out. As shown in FIG. 1, one major surface of the medium 20 is entirely covered with the surface 15. The unidirectional current I is caused to flow through said electrically conductive surface 15 in a direction perpendicular to the path along which the medium 20 is to be moved. This current may be produced, for example, by connecting a source of unidirectional voltage to a pair of contacts 30A or 30B resiliently engaging the surface 15 of medium 20. If the contact 30B is positive with respect to contact 30A, the direction of current I will be to the left, as indicated by the dashed line in FIG. 1. If the contacts 30A and 30B, which are normally disposed adjacent the corresponding edge of the medium 20, contact the surface 15 over a relatively small area, the current flow will be distributed substantially along the dashed line I indicated in FIG. 1. The contact area, however, must be of sufficient size to provide a good contact with the moving medium 20. The current I passes through a stationary magnetic field B directed, as shown by the arrow, normal to the major surfaces of the medium 20. In accordance with Fleming's left-hand rule, a force F will be produced on the electrical conductor-backed medium 20 which is in a direction normal to the direction of both the electrical current flow I and the direction of the magnetic field B, as shown in FIG. 1. If either the direction of the magnetic field or the direction of the current flow is reversed, the force F also will be reversed and the medium 20 would be moved in the opposite direction. On the other hand, if both the direction of the magnetic field B and the direction of the current I are reversed simultaneously (so that the current I flows to the right in the electrically conducting surface 15 and the magnetic flux is directed upwardly), the direction of the force F would remain unchanged. The resultant force F on the medium is in the direction of the desired motion and the magnitude of the force F is given by $F = lIB$ where $l$ is the length of the current path in the stationary magnetic field, I is the current, and B is the flux density of the magnetic field. In a device such as shown in FIG. 1, where the potential is applied across opposite edges of the medium 20, the length $l$ is the distance between the contacts 30A and 30B at the point of engagement with surface 15. In order to maximize the force F the contacts 30A and 30B are disposed as near as feasible at the edges of the medium 20, so that the length $l$ is a maximum.

Figure 2:
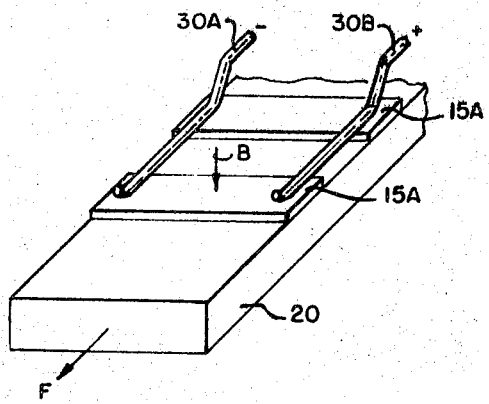
FIG. 2 is a view showing a modification of the device of FIG. 1 wherein transverse electrically conductive means are used.

In FIG. 2, the electrically conductive means takes the form of spaced transverse strips 15A. The contacts 30A and 30B now are arranged to span at least the distance between two adjacent strips so that the contacts are continuously in engagement with at least one of the electrically conductive strips 15A. The active length $l$ of the current path is substantially the same as the distance between contacts, just as in the device shown in FIG. 1.

In FIG. 3, a device is shown which employs longitudinal strips 25 of electrically conducting material, in contrast with the transverse strips shown in FIG. 2. Two such elongated strips 25 are shown in FIG. 3, one along each edge of the medium 20 to be transported along the direction indicated by the arrow F. Although, in some applications, a single longitudinal strip will suffice, there are other applications wherein two strips are needed to increase the force exerted on the medium 20. It is conceivable that, in some applications where the information is disposed on the major surface opposite the strips 25 or where the area devoted to information may be relatively small on the side on which the strips are located, that more than two strips may be used. Generally, however, the use of one or two strips along either one or two opposite edges is contemplated.

When longitudinal strips 25 are used, the two current carrying contacts 30A1 and 30A2 are placed near opposite edges of the given strip 25. Since two strips are shown in FIG. 3, a second set of contacts 30A3 and 30A4 is needed for the other strip. Separate magnetic field producing means are required for each strip, with their respective magnetic fields B1 and B2 being provided in the region of the respective current I1 and I2 falling between the set of contacts 30A1 and 30A2 and the set 30A3 and 30A4, respectively. In FIG. 3, the direction of the magnetic fields B1 and B2, as well as the direction of current flow I1 and I2 are shown in opposite sense simply to show that simultaneous reversal of the direction of current and direction of magnetic field will not change the direction of the force F which causes motion of the medium 20. The space along the medium 20 between the elongated strips 25 of electrically conductive material can be used effectively for carrying information. In other words, the same major surface of the medium 20 which contains the electrically conductive means 25 is used for information printing or reading. In contrast, the devices of FIGS. 1 and 2 are such that printing would have to be done on the major surface of a medium 20 opposite that which contains the electrically conductive means 25. There are certain electrically conductive surfaces such that printing may be applied directly thereto, in which case, the printing could be applied to either of the opposite major surfaces of the device of FIGS. 1 and 2, as well as that of FIG. 3.

FIG. 4 shows a medium transporting apparatus which uses the type of device illustrated in FIG. 3. The record medium 20, such as a paper strip, is moved along a bed or platen 40 in the direction indicated by the arrow F. The platen 40, in addition to supporting the moving paper strip 20, helps to prevent lateral motion, as well as buckling, of the paper strip 20. The platen 40 includes a reentrant lip which helps to retain the medium 20. In FIG. 4, a single elongated electrically conductive strip 25 is shown along one edge only of the paper strip 20. It should be understood, however, that more than one strip could be used, in the manner shown in FIG. 3. Electrode isolation of the electrically conductive strip and the platen is achieved by making the platen 40 of an electrically insulating material, such as plastic. The source 45 of unidirectional voltage is connected to the electrical contacts 30A1 and 30A2 which bear against the electrically conductive strip 25 adjacent opposite edges thereof. A unidirectional current from a power supply 70 flows through the electrically conductive strip 25 between the two contacts and is distributed substantially along a relatively narrow area between the regions of engagement of the contacts with the electrically conductive strip 25. A stationary magnetic field perpendicular to the direction of current flow is set up by a C-shaped magnet 50 which may be either an electromagnet or a permanent magnet. One of the pole pieces of magnet 50 may engage the bottom of the platen 40, while the other pole piece, which may be of reduced cross-section to accommodate the contacts 30A1 and 30A2 is spaced from the medium 20 only enough to permit free motion of the medium 20 past the magnet. The contacts 30A1 and 30A2 should engage the electrically conductive strip 25 over as short a length as possible, in order to prevent extraneous current paths which could produce forces tending to twist the medium 20 away from its desired path. The motion of the medium 20 can be stopped by reversing the current by means of a reversing switch 57 for a short duration to provide a force opposite to the direction of motion of the medium 20. If the magnet 50 is an electromagnet, as indicated in FIG. 4, the direction of motion could be reversed by reversing the direction of current applied to the magnet coil 59.

Another technique for medium transport is shown in FIGS. 5 and 6. The record medium 20, such as an elongated paper strip, includes a plurality of regions or spots 60 of a magnetic material. For example, the medium 20 may be Mylar on tape backed with islands of nickel-iron-cobalt material formed by edging of a continuous layer of nickel-iron-cobalt deposited on one side of the tape. In the device shown in FIGS. 5 and 6, the distance $d$ between two adjacent magnetic regions 60, is twice the length $s$ of a magnetic region. As indicated in FIG. 6, the magnetic regions 60 are disposed along each edge of the record medium 20. As in the case of the devices of FIGS. 1 to 4, however, only one row of magnetic regions need be used.

To achieve motion of the record medium 20, a magnetic activating means 65 is positioned adjacent the magnetic region 60. The magnetic activating means, as shown in FIGS. 5 and 6, includes a series of flat coils 66 surrounding the medium 20, each adapted to be connected sequentially, as by a switch 68, to a source 70 of unidirectional current. As each coil 66 is energized, the corresponding magnetic field B is produced in the direction indicated by the arrows B in FIG. 6. Starting in the position shown in FIGS. 5 and 6, the coil 66A is energized, attracting the magnetic region 60A. The adjacent magnetic region 60B is centered under coil 66C. Since the magnetic regions are firmly bonded to the record medium 20, the medium is moved in the direction of the arrow M. When the magnetic region 60A is centered under coil 66A, motion will cease and the record medium will be held in place for such operations as printing or reading. When motion again is desired, the coil 66B is energized, thereby attracting the magnetic region 60A until it is centered until coil 66B. Next, the coil 66C is energized and the magnetic region 60A will be attracted to a position under coil 66C. By this time, a new region 60 will be approaching and the sequence of operation above described will be repeated.

When motion is to be stopped, the coil currently being energized is held in the energized condition, assuring centering of the magnetic region and holding the medium 20 in place. Although a manually-operated mechanical switching means 68 is shown in FIG. 6, it should be understood that a rotary mechanical switch can be used or an electronic switch can be used to effect any combination of sequential or interrupted application of a voltage from the voltage source 70 to coils 66A, 66B and 66C.

In FIGS. 5 and 6, three coils are used and the spacing $d$ between adjacent magnetic region 60 is twice the length of the magnetic region 60, that is $d=2s$. If the spacing $d$ between adjacent magnetic regions 60 is three times the length of each region, then four coils would be used, three disposed in the space between adjacent magnetic region 60 and one juxtaposed with one of the aforesaid regions. In other words, a plurality of $(p+1)$ electromagnetic means are used where $p$ is the ratio of the distance between adjacent magnetic regions 60 to the length $s$ of a magnetic region. The above relationship holds except for the case where $p$ is equal to 1. In this case, if the space between adjacent magnetic regions 60 is equal to the length of a region and two electromagnetic activator means were used, in accordance with the above formula, the device would not operate properly since there would be ambiguity as to which of two magnetic regions 60 would be attracted to the energized coil lying between the adjacent magnetic regions. In other words, the above formula applies only when $p$ is greater than 1.

The direction of motion of the record medium 20 can be reversed by reversing the direction of current flow in the various coils 66, as by reversing the position of reversing switch 72.

What is claimed is:

1. In combination, an information-bearing medium to be transported along a predetermined path, first means for producing a fixed magnetic field perpendicular to said path and to said medium, said medium carrying an electrically conductive material, and second means independent of said first means for producing an electrical current flow through said electrically conductive material in a direction perpendicular to said magnetic field and to said path, the interaction of said electrical current and said magnetic field giving rise to a force for moving said medium along said path.

2. The combination according to claim 1 wherein said electrically conductive material is arranged in the form of at least one transverse strip.

3. The combination according to claim 1 wherein said electrically conductive material is arranged in the form of at least one elongated longitudinal strip.

4. The combination according to claim 3 wherein said magnetic field producing means is disposed in the region of said longitudinal strip.

5. In combination, an information-bearing medium to be transported along a predetermined path, means for producing a magnetic field adjacent to said path and perpendicular to said path, and means carried by said medium including a plurality of transverse electrically conductive strips disposed on at least a portion of a major surface of said medium for providing electromagnetic interaction with said magnetic field, said interaction giving rise to a force for moving said medium along said path.

6. In combination, an information-bearing medium to be transported along a predetermined path, means comprising a plurality of separately energizable means for producing a magnetic field adjacent to and parallel with said path, and means comprising a plurality of magnetic regions carried by said medium for providing electromagnetic interaction with said magnetic field, said interaction giving rise to a force for moving said medium along said path.

7. In combination, an information-bearing medium to be transported along a predetermined path, said medium carrying a plurality of spaced magnetic regions, a plurality of separately magnetizable means for producing a magnetic field parallel to said path, said magnetic field producing means being disposed adjacent one of said magnetic regions, the interaction of said magnetic field with said magnetic regions giving rise to a force on said medium for moving said medium along said path.

References Cited

UNITED STATES PATENTS

| 1,706,741 | 3/1929 | Pugh | 226—94 X |
| 2,731,212 | 1/1956 | Baker | 226—93 X |
| 2,831,131 | 4/1958 | Klotz | 310—13 |

FOREIGN PATENTS 251,081 10/1963 Australia.

ALLEN N. KNOWLES, Primary Examiner

U.S. Cl. X.R.

310—12